| VALVE TIER | I | II | III | IV | | V |
|---|---|---|---|---|---|---|
| VALVE NUMBER | 64 | 65 | 66 | 67 | 78 | 67a |
| BINARY CODE | 1 | 2 | 4 | 8 | 16 | 32 |
| HOME OR "0" | 0 | 0 | 0 | 0 | 0 | 0 |
| 1 | 1 | 0 | 0 | 0 | 0 | 0 |
| 2 | 0 | 1 | 0 | 0 | 0 | 0 |
| 3 | 1 | 1 | 0 | 0 | 0 | 0 |
| 4 | 0 | 0 | 1 | 0 | 0 | 0 |
| 5 | 1 | 0 | 1 | 0 | 0 | 0 |
| 6 | 0 | 1 | 1 | 0 | 0 | 0 |
| 7 | 1 | 1 | 1 | 0 | 0 | 0 |
| 8 | 0 | 0 | 0 | 1 | 0 | 0 |
| 9 | 1 | 0 | 0 | 1 | 0 | 0 |
| 10 | 0 | 1 | 0 | 1 | 0 | 0 |
| 11 | 1 | 1 | 0 | 1 | 0 | 0 |
| 12 | 0 | 0 | 1 | 1 | 0 | 0 |
| 13 | 1 | 0 | 1 | 1 | 0 | 0 |
| 14 | 0 | 1 | 1 | 1 | 0 | 0 |
| 15 | 1 | 1 | 1 | 1 | 0 | 0 |
| 16 | 0 | 0 | 0 | 0 | 1 | 0 |
| 17 | 1 | 0 | 0 | 0 | 1 | 0 |
| 18 | 0 | 1 | 0 | 0 | 1 | 0 |
| 19 | 1 | 1 | 0 | 0 | 1 | 0 |
| 20 | 0 | 0 | 1 | 0 | 1 | 0 |
| 21 | 1 | 0 | 1 | 0 | 1 | 0 |
| 22 | 0 | 1 | 1 | 0 | 1 | 0 |
| 23 | 1 | 1 | 1 | 0 | 1 | 0 |
| 24 | 0 | 0 | 0 | 1 | 1 | 0 |
| 25 | 1 | 0 | 0 | 1 | 1 | 0 |
| 26 | 0 | 1 | 0 | 1 | 1 | 0 |
| 27 | 1 | 1 | 0 | 1 | 1 | 0 |
| 28 | 0 | 0 | 1 | 1 | 1 | 0 |
| 29 | 1 | 0 | 1 | 1 | 1 | 0 |
| 30 | 0 | 1 | 1 | 1 | 1 | 0 |
| 31 | 1 | 1 | 1 | 1 | 1 | 0 |
| 32 | 0 | 0 | 0 | 0 | 0 | 1 |

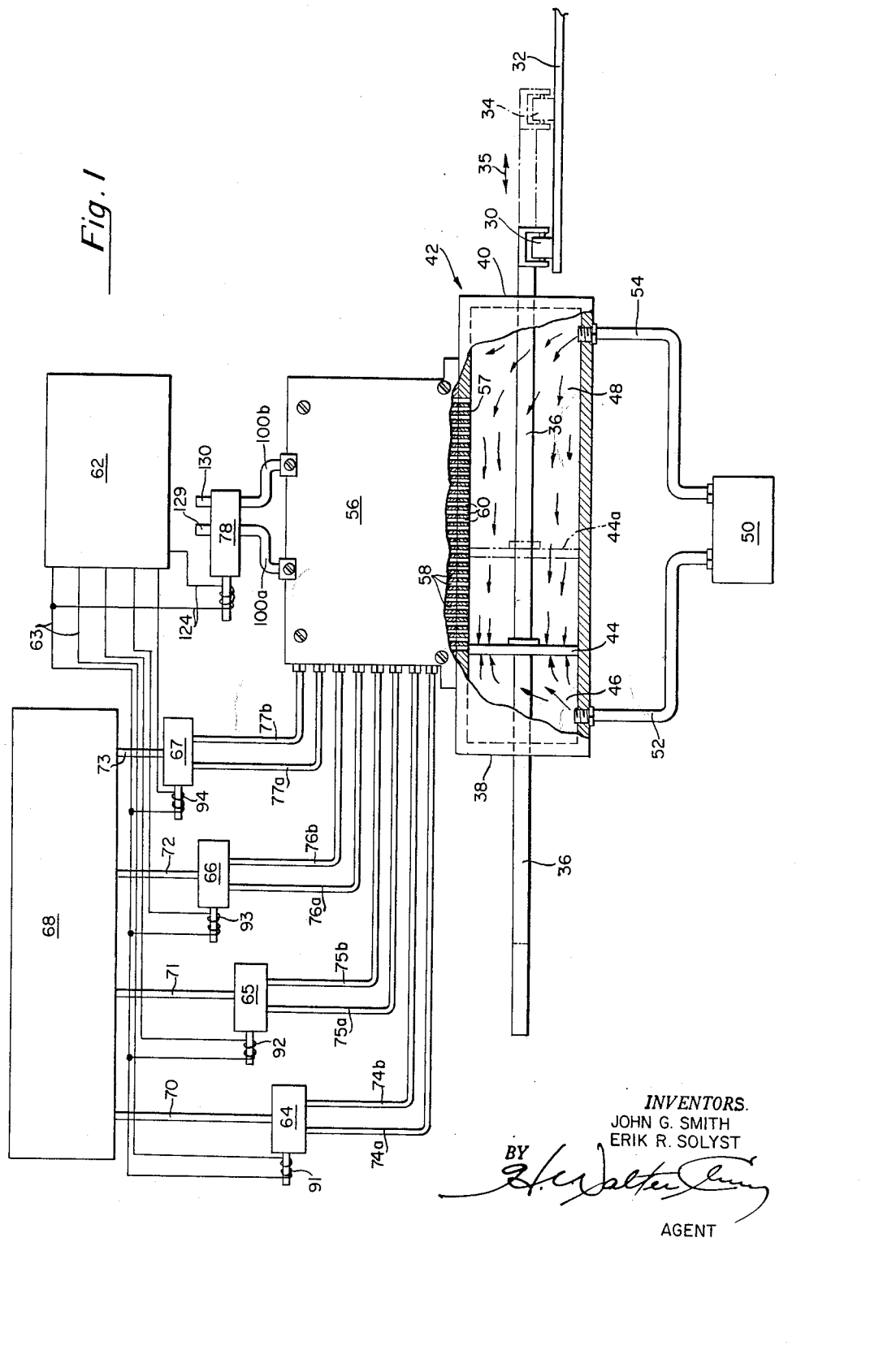

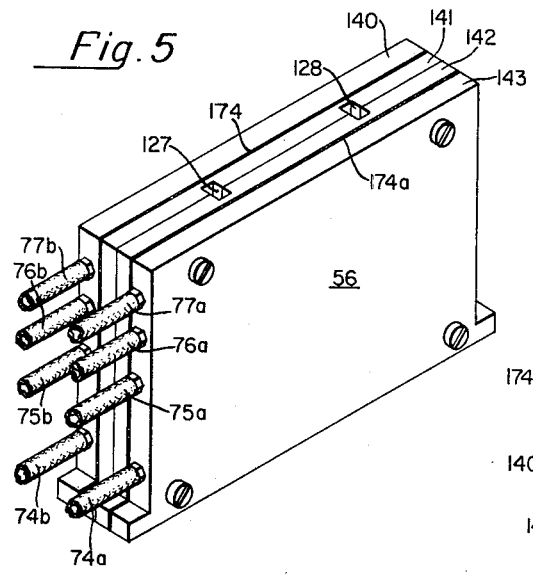
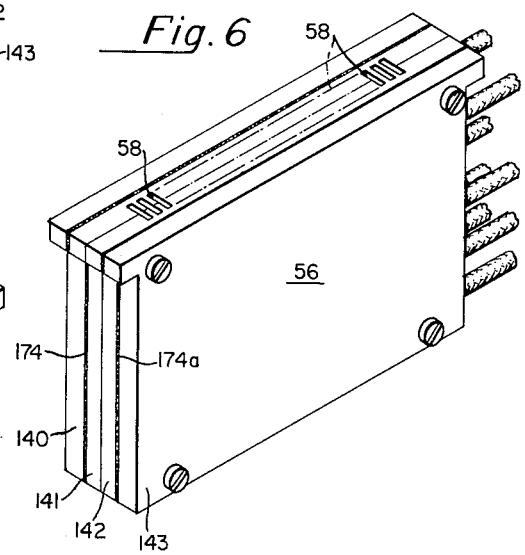
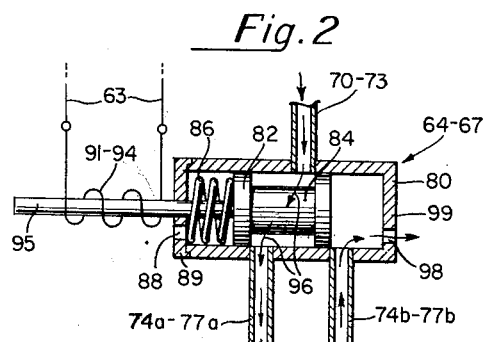
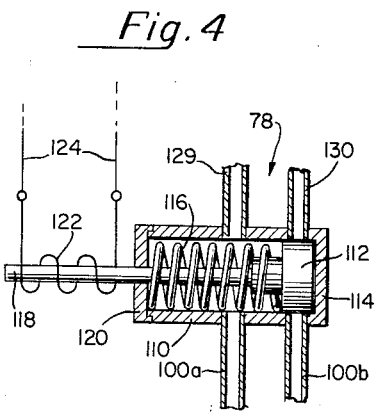
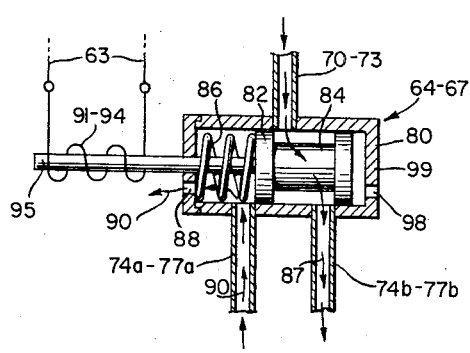

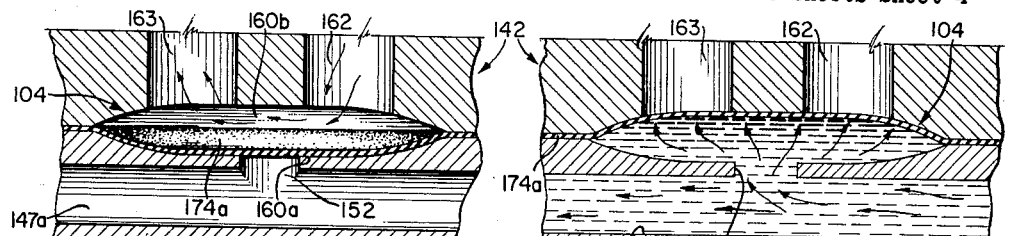
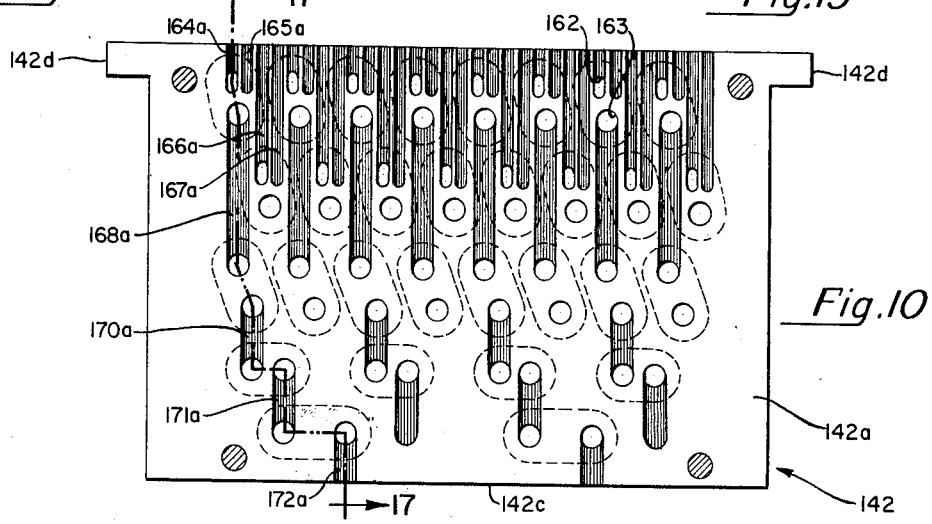
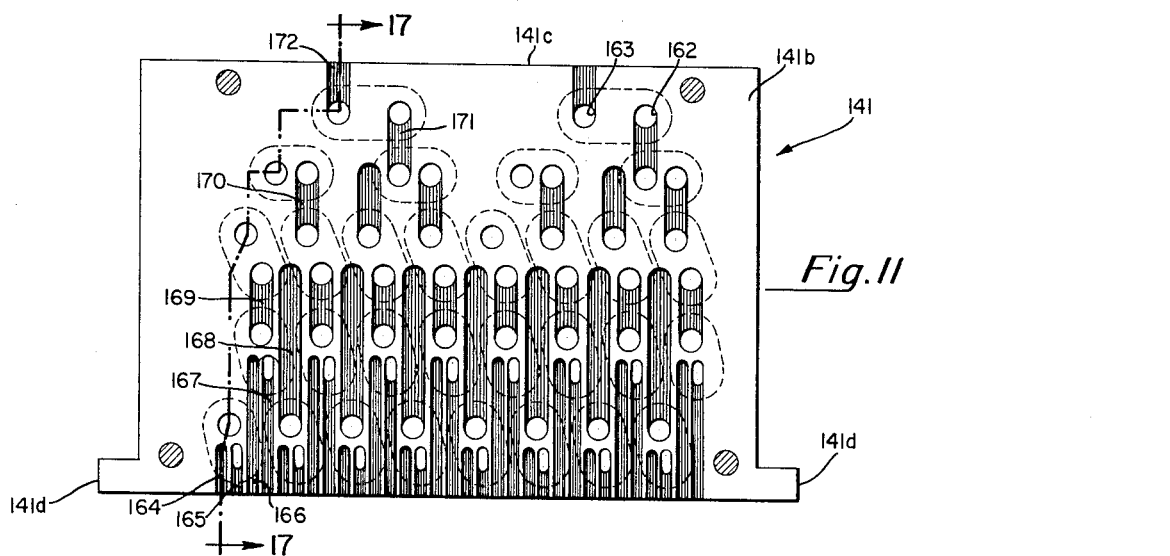

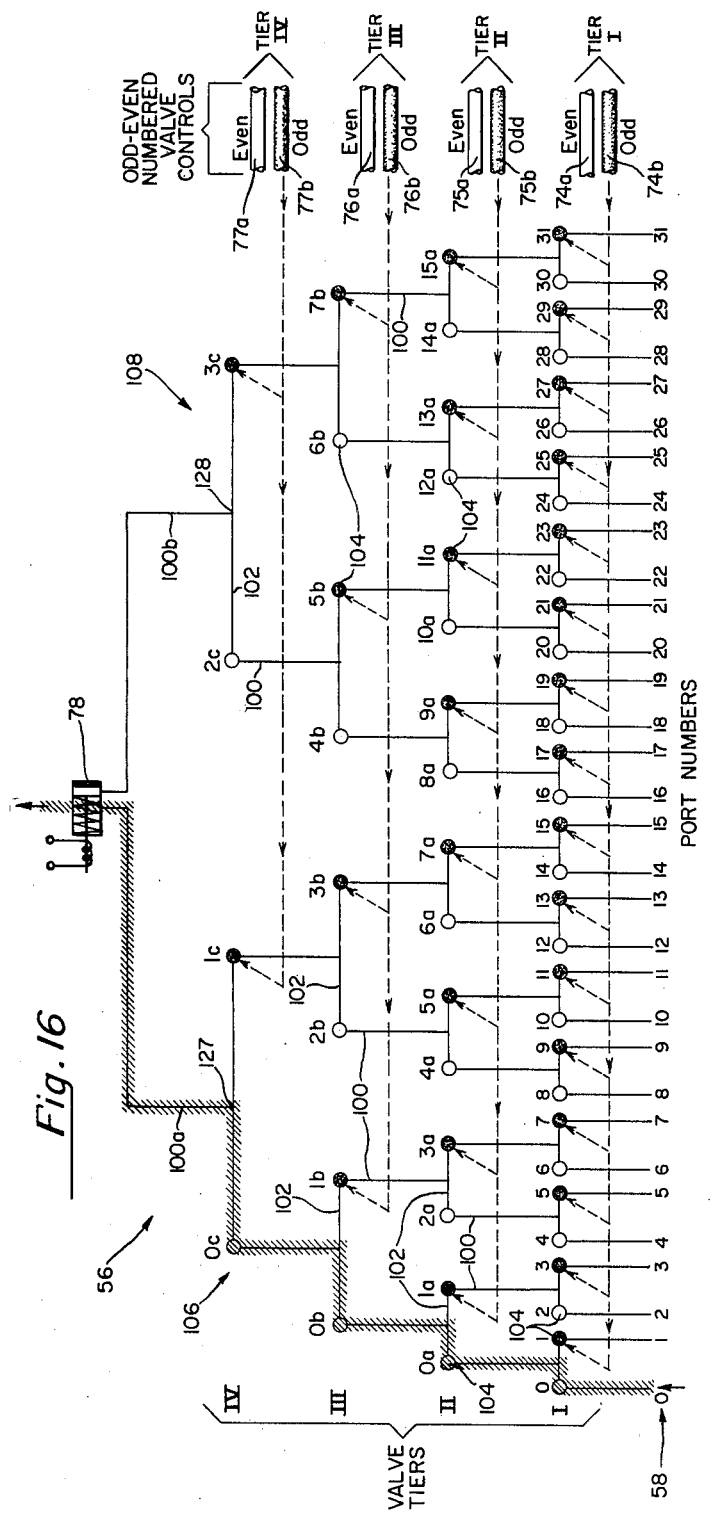

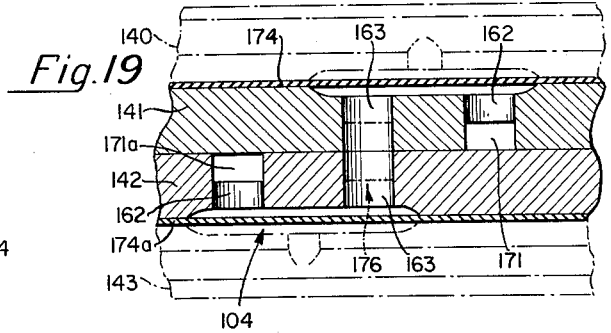
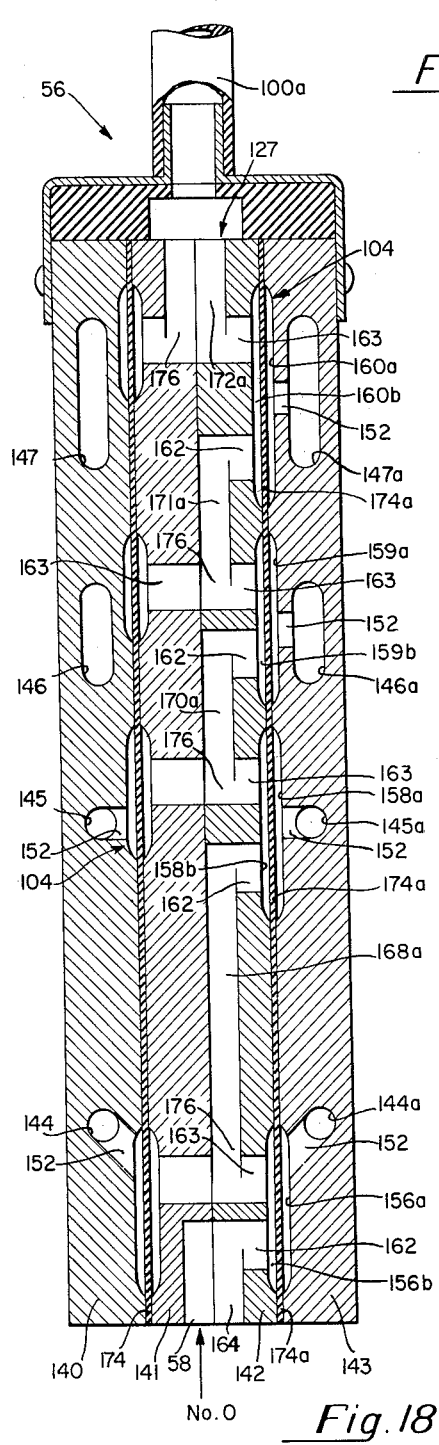
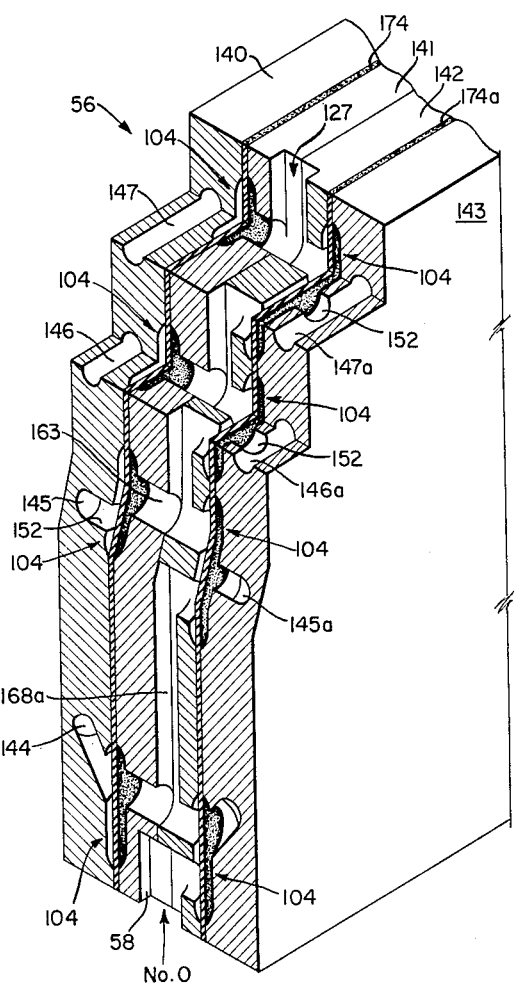

(PORT NUMBERS)

*Fig. 20*

United States Patent Office 3,156,157
Patented Nov. 10, 1964

3,156,157
POSITIONING CONTROL SYSTEM AND
APPARATUS
John G. Smith, Philadelphia, and Erik R. Solyst, Havertown, Pa., assignors to Burroughs Corporation, Detroit, Mich., a corporation of Michigan
Filed Apr. 11, 1961, Ser. No. 102,224
11 Claims. (Cl. 91—48)

The invention hereinafter described and claimed has to do with fluid operated control systems for effecting successive and selective point-to-point positioning of associated fluid operated apparatus. More specifically the invention relates to fluid control systems responsive to binary electrical signals to cause movement of associated fluid controlled apparatus to ordinally arranged positions.

The primary object of this invention is to provide a quick-acting fluid actuated control system for effecting rapid and accurate point-to-point positioning of apparatus movable by fluid means to a plurality of different and successive positions without homing between positions.

Another object of the invention is to provide such a system operable in response to a predetermined code of binary electrical signals to cause fluid responsive mechanism to move associated apparatus to corresponding point-to-point positions in accordance with an ordinal arrangement.

Still another object of the invention is to provide a binary controlled fast acting fluid operated valve complex for use in such a control system.

In accordance with the above objects and first briefly described, the invention comprises a fluid control system and apparatus including a piston actuated mechanism wherein the position of the piston in its cylinder establishes the position of the mechanism. To move the piston, the opposite end chambers of the cylinder are connected to a source of fluid pressure to establish equal pressures on opposite sides of the piston. Valve means having multiple successive ordinally related ports opening into the cylinder and aligned along the path of movement of the piston is operable in response to a predetermined code of binary electrical signals from a suitable source selectively to open a corresponding one of the ports to atmosphere thus to effect a reduction in the pressure on one side of the piston causing it to move in the direction of the open port. Arrival of the piston at the selected position closes the port, and restores equal pressures on the opposite sides of the piston to stop and hold it against further movement.

In the drawings:

FIG. 1 is a schematic of a system incorporating the invention;

FIGS. 2 and 3 are sectional views showing different operational views of a solenoid operated control valve in the fluid pressure supply lines to the master control valve shown in FIGS. 5 and 6;

FIG. 4 is a sectional view of a solenoid operated exhaust valve for the outlet conduits of the master valve;

FIG. 5 is a perspective view of the master valve forming an important part of the invention;

FIG. 6 is a view similar to FIG. 5 but taken with the valve inverted from its position in FIG. 5;

FIGS. 8, 9, 10, 11, 12 and 13 are views of various elements of the master valve structure of FIGS. 5 and 6, and taken along correspondingly identified lines on FIG. 7;

FIGS. 14 and 15 are sectional operational views of a single valve unit of the master valve structure;

FIG. 16 is a schematic of the master valve;

FIG. 16a is a partial schematic illustrating an expansion of the schematic of FIG. 16;

FIG. 17 is a perspective sectional view of the master valve as taken along line 17—17 of FIGS. 8–13;

FIG. 18 is a flattened-out view of the sectional surfaces of FIG. 17;

FIG. 19 is a fragmentary sectional view taken along line 19—19 of FIG. 9; and

FIG. 20 is a schematic of the binary control for ordinally arranged valve ports.

Figure 7:
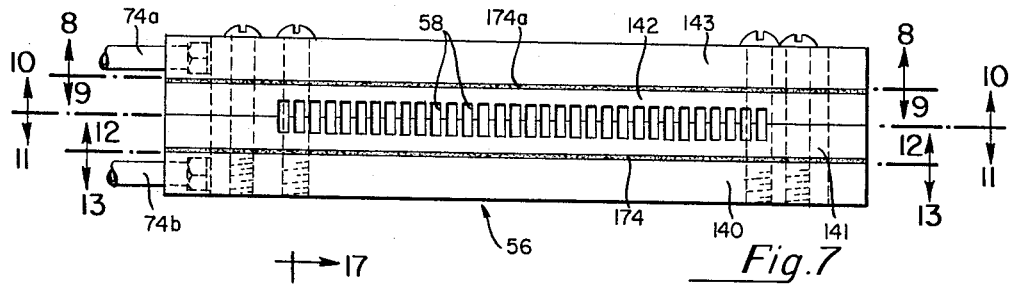
FIG. 7 is a plan view of the valve as shown in FIG. 6.

Referring now more particularly to the drawings illustrating the preferred embodiment, and first to FIG. 1, it is seen that the system aspects of the invention have been illustrated, by way of example, in association with apparatus for positioning a magnetic transducer 30 along a radius and relative to the surface of a magnetic disk 32 in a manner whereby the transducer may be moved across the surface from one ordinally arranged position selectively to another, as shown in broken lines at 34 and the arrow 35, for recording or reading magnetic information, as the case may be. It is understood, of course, that the disk and transducer are illustrative only of the many alternative applications open to such point-to-point positioning apparatus.

Movement of the transducer 30 is effected by the shaft 36 to which it is secured and which in this illustrated embodiment extends axially through and beyond the walls 38 and 40 closing the ends of a cylinder 42. A piston 44 is secured to the shaft within the cylinder and separates the cylinder into end chambers 46 and 48, the size of which vary in accordance with the position of the piston. A suitable source 50 of constant above atmospheric fluid pressure, such as, and preferably air, is in open communication with each of the chambers 46 and 48 by way of conduits 52 and 54 respectively, and normally maintain equal pressures within the chambers, thus to hold piston 44 in a selected position.

To effect movement of the piston and consequently the transducer 30, means is provided to produce a pressure differential across the piston until it reaches the position corresponding to that desired for the transducer, then to remove the pressure differential. To this end a fluid operated master control valve 56 is fixed to the outer wall 57 of the cylinder. The bottom surface of the master valve includes a plurality of ordinally arranged fluid outlet ports 58 axially aligned along the path of movement of the piston and each aligned with a corresponding port 60 in the cylinder wall. While it is contemplated that a greater or lesser number of ports may be used, as will be more clearly understood as this description unfolds, thirty-two starting with "0" and ending with "31"—have been illustrated in this embodiment as being sufficient for effecting the desired range of movement for the transducer 30.

In the manner more fully described hereinafter, each of the ports 58 selectively may be opened to atmosphere thus to effect a pressure reduction in one of the chambers 46 or 48 depending upon the position desired for the transducer. Selection and control of the port is by means of a suitable source of binary electrical signals, shown generally as the block 62, but which may be a binary output computer of any well known type, or other suitable well-known equipment, such as punched tape apparatus.

The binary electrical signal output of the apparatus 62 is used selectively through electrical conductors 63 to energize four solenoid control valves 64 through 67 for controlling the flow of fluid from a suitable source 68 by way of fluid conducting conduits 70 through 73 and selectively through either of a pair of fluid conduits from each of the solenoid valves to the master valve 56, and identified successively from left to right by the numerals 74a and 74b through 77a and 77b. The binary output is also used to control another solenoid valve 78 at the outlets of master valve 56 for controlling the porting of fluid flow through the valve to atmosphere, as more clearly brought out below.

As seen in FIGS. 2 and 3, each of the binary controlled solenoid valves 64 through 67 comprises a cylindrical casing 80 housing a piston 82 relieved in the center as at 84 for permitting free air flow therearound, and normally biased to the righthand end of the cylinder, as seen in FIG. 3, by a coil spring 86. With the four valves in this normal condition, fluid, such as air, will flow through conduits 70–73 and the "b" conduits of the pairs 74 through 77 to the master valve 56, as indicated by the arrows 87. The "a" conduits normally are open to atmosphere through the lefthand end of the valve chamber and an aperture 88 in the end wall 89, as indicated by the arrows 90. Energization of any of the solenoids 91 through 94 of valves 64–67 by the control means 62 is effective to pull its associated armature 95 and its connected piston 82 to the left, as seen in FIG. 2, to change the air flow from the "b" conduit to the "a" conduit of the selected pairs, as indicated by the arrows 96 in FIG. 2. As seen here, the "b" conduits are open to atmosphere by way of the righthand end of the valve chamber and an aperture 98 in its end wall 99.

The manner in which this air flow from valve 74 through 77 effects point-to-point positioning of piston 44 by way of master valve 56 will now be described.

With reference to FIG. 16, schematically illustrating the air flow to atmosphere through master valve 56, it will be understood that the numerals 0 through 31 at the bottom of the figure identifies the ordinally positioned ports 58, see FIGS. 1 and 6. The vertical and horizontal lines 100 and 102 indicate fluid passageways and ports respectively in the valve, while the circles 104 at the junctures of lines 100 and 102 indicate tiers of valve units which are fluid controlled by way of the conduit pairs 74a and b through 77a and b and which are here indicated as Even and Odd respectively; that is, the "a" valves are Even and the "b" Odd. Fluid pressure through the Even or "a" conduits close the Even numbered valve units 104 and fluid through the Odd or "b" conduits close the Odd numbered valve units 104 in the manner described hereinafter.

Also, as seen in this figure, the various conduits, ports and valve units form what might be termed a pair of valve trees generally indicated by the numerals 106 and 108, each encompassing 16 of the ports 58, and each selectively openable to atmosphere by the control means 62 as hereinafter described. Both of these trees terminate at valve 78 which in its normal condition, as seen in FIGS. 4 and 16, vents only tree 106 directly to atmosphere.

In FIG. 4 it is seen that valve 78 comprises a cylinder 110 housing a piston 112 mounted in the cylinder for reciprocal movements but normally urged to the right, adjacent end wall 114, by a coil spring 116 at its other end. Attached to the left end of the piston 112 is a shaft 118 which extends through the spring 116 and the left end wall 120 to form the armature of a solenoid 122 controlled through conductors or wires 124 (FIG. 1) from the binary control mechanism 62. Connected to the cylinder are the conduits 100a and 100b leading from outlet ports 127 and 128 (FIG. 5) of valve trees 106 and 108 respectively of master valve 56. Corresponding cylinder outlet ports 129 and 130 permit either of the conduits 100a and 100b respectively to be opened to atmosphere depending upon the position of piston 112 in cylinder 110. In its normal condition, as illustrated, any one of the ports 58 in valve tree 106 may be opened to atmosphere through port 127, conduit 100a, the left end of cylinder 110 an outlet port 129. Conduit 126 and outlet port 130 are blocked by the piston. Energization of the solenoid 122 causes the piston 112 to move to the left to an extent blocking conduit 100a and outlet port 129 closing off the fluid flow from tree 106 and unblocking conduit 100b and outlet port 130 whereby a port 58 in tree 108 may be opened to atmosphere. De-energization of solenoid 122, of course, permits the spring 116 to return piston 112 to the position shown in FIG. 4.

Looking again at FIG. 16, it will be observed that the first of the ports 58 on the left of the row is identified as the "0" port which may also be considered the "home" port. Under normal conditions of operation, and when the binary control apparatus is not calling for one of the numbered ports 1 through 31, the "0" numbered valve unit in each tier is open to atmosphere through valve 78 and the piston will remain in the "home" position, or return there automatically from another position to which it previously had been moved.

Now to follow the system through with a specific example, and with reference to FIG. 1, it is seen that piston 44 in the cylinder 42 is in its "home" position shown in full lines, and solenoid valves 64 through 67 are in their normal condition (FIG. 3) closing all odd numbered valve units in master valve 56, closure of the valves being indicated by the stippling in the valve circle 104. Let it be assumed that with initiation of operation it is desired to move transducer 30 relative to disk 32 to the position shown in broken lines at 34, which corresponds to the piston position over the port 58 identified as No. 12 in FIG. 16. As indicated in FIG. 20, this position is effected by signals energizing solenoid valves 66 and 67 in Tiers III and IV thus to condition them as seen in FIG. 2; that is, with their solenoids 93 and 94 energized, and each of the corresponding pistons 82 in the lefthand position wherein fluid pressure from source 68 may flow through conduits 72 and 73 past the reduced central portion 84 of the piston 82, into and through conduits 76a and 77a to close the corresponding even-numbered valve units in the valve trees 106 and 108, thus opening the opposed odd numbered valve units. Fluid flow through solenoid valve 64 and 65 remains unchanged and the odd numbered valve units in Tiers I and II remain closed, while the even numbered remain open. This condition of the valve units in the four tiers opens two fluid flow paths through valve 56. These may be traced through FIG. 16 beginning at ports Nos. 12 and 28. In valve tree 106 it will be seen that even numbered valves 12 and 6a and odd numbered valves 3b and 1c will be open, and in tree 108 valves 28, 14a, 7b and 3c will be open. It will be understood that in this condition the stippling in the valve circles in Tiers III and IV should now be in the even instead of the odd numbered circles. No other path from any of the other ports 58 is open completely through valve 56.

As described above, with the selection of any port in tree 106 the solenoid valve 78 is in the condition shown in FIG. 4, that is, to vent only those open ports in the range 0 through 15. Therefore, it will be understood that only port No. 12 in tree 106 will be directly open to atmosphere through the path described above and valve 78, and that port 28 in tree 108 which is the only other port open through the master valve 56, is closed to atmosphere by solenoid valve 78. Fluid now is permitted to flow from chamber 48 in cylinder 42, see FIG. 1, through port No. 12 to atmosphere creating a pressure differential or reduction across piston 44 which will be moved to the right by the higher fluid pressure in chamber 46. When the piston reaches and closes port No. 12, as indicated in broken lines 44a, the pressure across the piston is equalized, thus stopping and retaining it in this position. The transducer 30, of course, has been moved from the position shown in full lines to the position shown in broken lines at 34. Other ports may selectively be opened to atmosphere in a similar manner by the output of binary electrical signals from the apparatus at 62.

The binary electrical signal output of the apparatus 62 is used to select or vent to atmosphere a correspondingly numbered port 58. This one-for-one relationship is clearly indicated in FIG. 20. As seen here, the thirty-two ports listed along the left side of the figure (0 to 31 inclusive) are followed by their corresponding binary code valves or weight indicated at the heads of the columns. For example, port No. 1 is followed by a signal indication or "1" in the column under the binary code for a "1" with all the remaining columns indicating a "0" condition. It also indicates that for this port it is only necessary to energize solenoid valve 64 in order to change the valve units 104 in Tier I from their normal condition closing the odd numbered ports (FIG. 3) to the condition closing the even numbered ports. Correspondingly, any one of the other ports may be selected. Port 15, for example, necessitates energization of each of the valves 64 through 67, but not valve 78.

A decrease in the number of ports 58 may be effected by using only one of valve trees 106 or 108. An increase may be effected by adding one or more trees, and additional valves such as shown at 78 with appropriate control from the program device 62. On the other hand, however, a decrease or an increase may better be accomplished by decreasing or increasing the number of valve unit Tiers. Elimination of Tier I, for example, would reduce the number of ports 58 by half. Adding another Tier, as seen in FIG. 16a, will increase the number of ports to twice that shown in FIG. 16, or 64. Still another, or sixth Tier, would double the number again, to 128. With each such increase, another solenoid valve 67a (FIG. 16a) of the kind shown in FIGS. 2 and 3, would be necessary. In this regard FIG. 20 includes an exemplary sixth column with a binary weight of 32, and the additional valve 67a for controlling an additional valve Tier V for a total of 64 ports.

From the above it is seen that the sysem aspects of the invention provide a flexible, fluid-actuated control system for effecting rapid and accurate point-to-point positioning of associated apparatus movable by fluid means to a plurality of different ordinally related positions in response to binary electrical signals of corresponding value.

Now in accordance with another aspect of the invention, the master valve 56 comprising an important feature thereof will be described.

Figure 13:
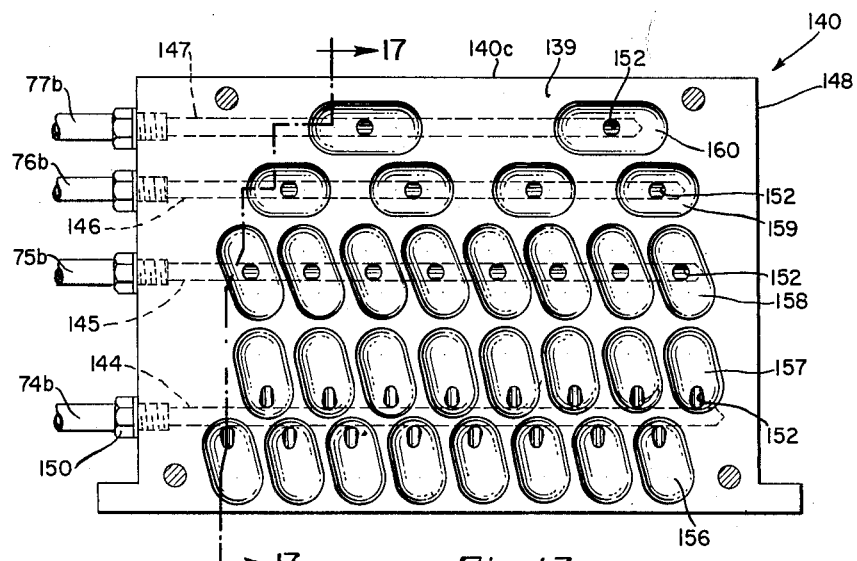

As seen in FIGS. 5 and 6, the valve preferably comprises a substantially rectangular overall construction formed by four plates 140, 141, 142 and 143, which may be metallic or other suitable material, secured together in face-to-face assembly as by the shown screws, or other means. With reference to FIG. 13, it will be seen that the inner surface 139 of plate 140 is provided with a plurality of parallel fluid passageways 144, 145, 146 and 147 extending through the plate from left to right but terminating short of the right edge 148. The left ends of these passageways are provided with couplings 150 for connecting the conduits 74b through 77b to the odd numbered valve units 104, as described below. The passageways 144 through 147 are in open communication through apertures 152 with rows of shallow depressions 156, 157, 158, 159 and 160 forming the control sides of the odd numbered valve units in the four Tiers, I, II, III and IV respectively. It will be seen that the two rows of depressions 156 and 157 are in open communication with only a single passageway 144 which is connected to conduit 74b, and that each of the other passageways is in open communication with only one row of depressions. This arrangement affords a shorter and much more compact valve structure, for if all of the depressions in rows 156 and 157 were in one line the valve structure necessarily would have to be twice as long to accommodate them. In effect, however, it may be considered that the depressions 156 and 157 are in one row as are the others.

Figure 12:
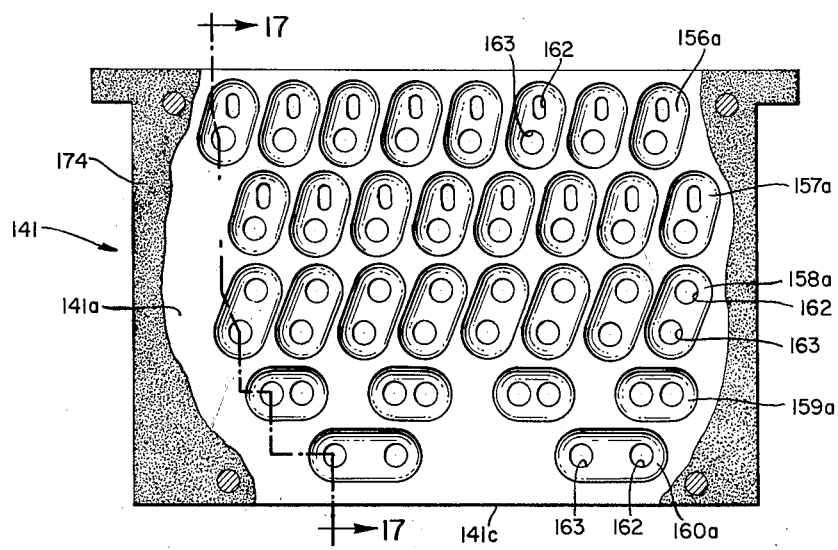

Valve plate 141, on the side illustrated in FIG. 12, is similar to valve plate 140 shown in FIG. 13, just described, in that its face 141a is provided with complementary formed depressions 156a, 157a, 158a, 159a and 160a. These two plates, as seen in FIGS. 12 and 13, are rotated from their assembled condition 180° relative to each other about their top edges 140c and 141c. Each of the depressions 156a–160a is provided with a pair of apertures forming inlet and outlet ports 162 and 163, which extend through the plate to the opposite side 141b (FIG. 11) where they communicate with vertically disposed grooves in its face which, when closed, as described later, form fluid passageways 164, 165, 166, 167, 168, 169, 170, 171 and 172, generally identified by the numeral 100 in FIG. 16. Sandwiched between plates 140 and 141, as seen in FIG. 18 and by the stippled portion of FIG. 12, and completing the even numbered valve units 104, is a flexible diaphragm or membrane 174 providing the means for closing the valve units associated with these two plates in response to fluid pressure through the Tiers I through IV on the "Odd" side of the valve.

FIGS. 14 and 15 show a typical valve unit similar to all the others, and in its two operational conditions. As seen here, fluid pressure in the passageway 147a, by way of example, will cause the flexible membrane 174a to flex from its condition shown in FIG. 14 wherein fluid is flowing through the valve by way of inlet and outlet ports 162 and 163 respectively, and depression 160b, to the condition shown in FIG. 15 wherein fluid pressure in passageway 147a is sufficient to overcome the fluid pressure on the other side of the membrane and flex the latter into depression 160b to seal the ports 162 and 163 and close the valve unit against the free circulation of fluid through the ports.

Figure 9:
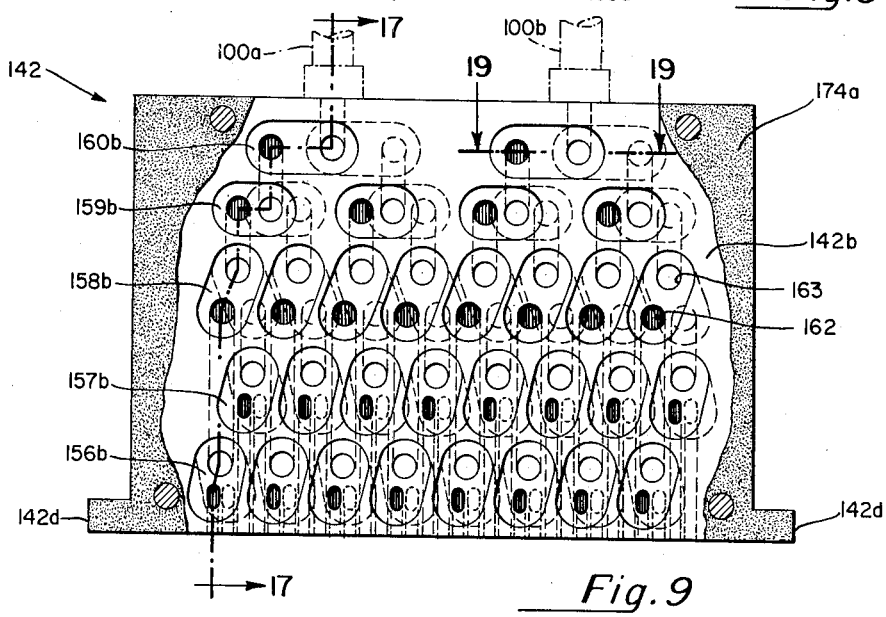

Plate 142, as seen in FIGS. 9 and 10, is constructed similarly to plate 141. Face 142a thereof, as seen in FIG. 10, is provided with a plurality of vertically disposed grooves 164a, 165a, 166a, 167a, 168a, 170a, 171a and 172a. When plates 141 and 142 are arranged face-to-face as seen in FIGS. 7, 17 and 18, the grooves 164 through 172 in plate 141 and grooves 164a through 172a in plate 142 form the enclosed fluid passageways 100 (FIG. 16) cooperating with inlet and outlet ports 162 and 163 to interconnect the valve units 104 (FIG. 16). FIGS. 10 and 11 show these plates—142 and 141 respectively—rotated relative to their assembled relationship. In other words, the top edges 141c and 142c of the plates are shown adjacent each other. In assembling them together plate 142—as seen in FIG. 10—would be rotated 180° forwardly and downwardly about its top edge, placing its bottom flanges 142d on top of the bottom flanges 141d of plate 141.

Figure 8:
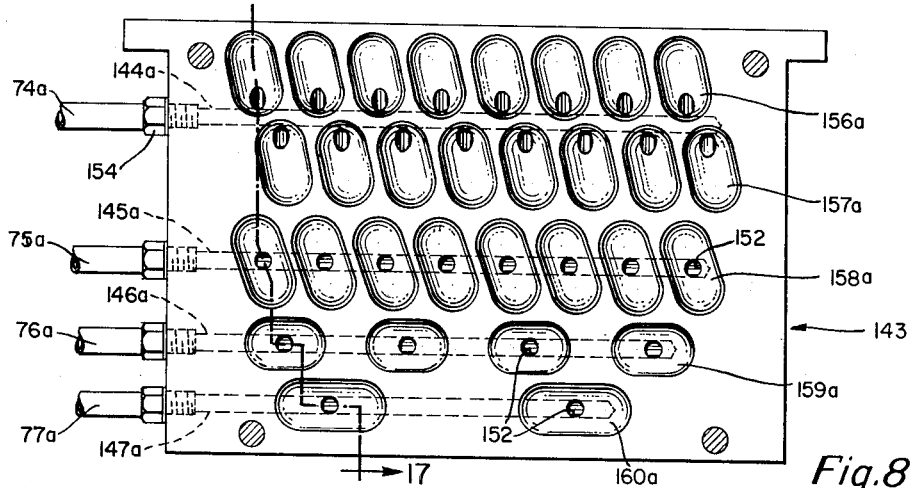

The other side 142b of plate 142 (FIG. 9) is similar to the side 141a of plate 141 shown in FIG. 12, while plate 143 (FIG. 8) is similar to plate 140. Plate 143 is provided with parallel passageways 144a, 145a, 146a and 147a in open communication with the valve depressions 156a, 157a, 158a, 159a and 160a. The left end of the passageways are connected through suitable couplings 154 to the conduits 74a, 75a, 76a and 77a controlling the even numbered valves. Between plates 142 and 143 is another flexible diaphragm or membrane 174a (FIGS. 9 and 18) providing means for controlling the fluid flow through these valves in the manner described above, and completing the even numbered valve units 104.

With reference now to FIGS. 17, 18 and 19, it will be seen how the assembly of these plates and membranes is effective to provide the operation described above for venting a particular port 58 to atmosphere. In these views the membranes 174 and 174a are at rest with pressure equalized on both sides and therefore no port has been selected for actuation, but for purposes of illustration it may be considered that all valves on the "Odd" side—the left side in this view—are closed and the apparatus in its "home" condition with the "0" port open to atmosphere. Looking at FIG. 18, which is a flattened out view of the sectional portions of FIG. 17, it can be seen that fluid can flow into the valve structure at the port indicated at the bottom of the figure as No. 0, through passageway 164, inlet port No. 162, valve depression 156b, outlet port No. 163, passageway 168a, inlet port No. 162, depression 158b, outlet port No. 163, passageway 170a, inlet port No. 162, depression 159b, outlet port No. 163, passageway 171a, inlet port No. 162, depression 160b, outlet port No. 163, passageway 172a, outlet port No. 127 and into valve conduit 100a secured over port No. 127, and from which it can flow through the open side of solenoid control valve 78 to atmosphere. As just described, it can now be seen that an open passageway exists from "home" port No. 0 through the master control valve to the outlet 100a.

It will also be understood that in some instances fluid courses from one side of the valve to the other in venting certain ports 58 to atmosphere. For example, in FIG. 19 it can be seen that fluid from a selected port can flow from one side of the valve to another through interconnected ports 162 and 163 of plates 141 and 142, as identified by the numeral 176 in this figure. Looking at FIG. 16, notice that the flow of fluid through ports No. 0 and 16 to atmosphere will be through only the Even side of the valve. Flow from port No. 0 will be through the valve units marked "0" in each Tier, and from port No. 16 through valve units 16, 8a, 4b and 2c. Likewise flow from only two of the Odd ports (15 and 31) can be traced through the master valve without crossing from one side of the valve to the other. Tracing the others, however, will show that at one valve Tier or another a cross-over from one side of the valve to the other is necessary. For example, fluid flow through port No. 5 is through valve 5 in Tier I on the Odd side, from which it must cross over to the Even side to pass through valve 2a at Tier II, then back to the Odd side at Tier III to pass through valve 1b, and finally back to the Even side to pass through valve 0c. Some of these cross-overs are shown in FIGS. 17 and 18 at 176, but the section is taken in such a manner that its course after cross-over cannot be shown. However, FIG. 19 may be considered typical in this respect.

Thus it is now clearly established that the present invention in addition to its system aspects, also affords a low mass, quick acting fluid controlled valve structure which may be controlled by binary coded devices for effecting selection of one of a plurality of its ordinally arranged valve ports.

What is claimed is:

1. A control system for effecting movement of associated apparatus to selected positions comprising, means forming a chamber and including a plurality of ports disposed along its length, movable means within and dividing said chamber into separate compartments, means operatively interconnecting said movable means with the apparatus to be moved, means for effecting equal fluid pressures of a medium across said movable means whereby it is held immobile, means to effect a pressure differential across said movable means whereby greater pressure on one side will cause the movable means to move in the direction of least pressure, said pressure differential means defining first passageways arranged in groups for conveying the medium from the chamber through selected ones of said first passageways, a plurality of second passageways, each associated with a group of said first passageways, diaphragm means interposed between said first and second passageways and actuatable to block the flow of the medium through said first passageways, and means for selectively varying the pressure in ones of said second pasasgeways to thereby actuate said diaphragm means to block the flow of the medium in ones of said first passageways to thereby enable said medium to flow through others of said first passageways.

2. A control system for effecting movement of associated apparatus to selected positions comprising, means forming a chamber and including a plurality of ports disposed along its length, movable means within and dividing said chamber into separate compartments, means operatively interconnecting said movable means with the apparatus to be moved, means for effecting equal fluid pressures of a medium across said movable means whereby it is held immobile, means to effect a pressure differential across said movable means whereby greater pressure on one side will cause the movable means to move in the direction of least pressure, said pressure differential means including inner members disposed in facing relationship one to another and defining first passageways therebetween for conveying the medium from the chamber through said ports, outer members disposed in sandwiching arrangement with said inner members and having a plurality of second passageways one for each group of first passageways, said inner and outer members defining a plurality of cavities therebetween, the latter communicable with said first and second passageways, diaphragm means interposed between said inner and outer members to divide each said cavity into a pair of compartments and adapted when actuated to block said first passageways, means for permutably applying pressure within selected ones of said second passageways to actuate said diaphragm means to block predetermined ones of said first passageways and to permit flow of fluid through a given port and first passageways associated therewith.

3. A control system for effecting movement of associated apparatus to selected positions comprising, a cylinder having a plurality of ports disposed along its length, a piston within said cylinder, means operatively interconnecting said piston with the apparatus to be moved, means for effecting equal above atmospheric fluid pressures of a medium across said piston whereby the piston is held immobile, means to effect a pressure differential across said piston whereby greater pressure on one side will cause the piston to move in the direction of least pressure to a selected position, said pressure differential means defining a plurality of first passageways arranged in groups and connected to said ports in said cylinder for conveying a fluid medium therethrough, said pressure differential means further defining a plurality of second passageways one for each group of first passageways, yieldable partition means interposed between and separating said first passageways from said second passageways, said yieldable partition means being deflectable from a normally unstretched state to a position in blocking engagement with said first passageways, and means for selectively controlling the said second passageways to cause said yieldable partition means to be deflected to block the flow of the fluid medium through predetermined first passageways to thereby permit fluid to flow through other of said first passageways.

4. A control system for effecting movement of associated apparatus comprising, a cylinder, a piston within said cylinder, means operatively interconnecting said piston with the apparatus to be moved, means for effecting equal above atmospheric fluid pressures of a medium across said piston whereby the piston is held immobile, means to effect a pressure differential across said piston whereby greater pressure on one side causes the piston to move in the direction of least pressure, said pressure differential means including a pair of inner members disposed in abutting facing relationship and including a plurality of first passageways arranged in groups in the abutting surfaces, said first passageways being adapted to convey fluid from said cylinder through said ports, a pair of outer members enclosing said pair of inner members and including a plurality of cavities in opposed mating faces thereof, each said cavity including an access opening into a first passageway, said outer members including a plurality of second passageways each associated with a group of first passageways and opening into ones of said cavities, diaphragm means interposed between said inner and outer members to divide each said cavity into two compartments, and means for selectively varying the pressure in said second passageways to move said diaphragm means in predetermined cavities in blocking engagement with the access opening therein to thereby limit the flow of the medium through predetermined ones of said first passageways.

5. A control system for effecting movement of associated apparatus comprising, a cylinder having a plurality of ports disposed along its length, a piston within said cylinder, means operatively interconnecting said piston with the apparatus to be moved, means for effecting equal above-atmospheric fluid pressures of a medium across said piston whereby the piston is held immobile, means to effect a pressure differential across said piston whereby greater pressure on one side will cause the piston to move in the direction of least pressure, said pressure differential means including pairs of inner and outer members having planar surfaces and disposed in opposed facing relationship, the opposed faces of said inner pair of members including a plurality of grooves to define a plurality of first passageways arranged in groups for conveying the fluid medium from said ports in said cylinder, said outer members including a plurality of second passageways one for each group of said first passageways, the opposed faces between said inner and outer members each having a plurality of depressions to define a plurality of cavities communicable with said first and second passageways, a sheet of yieldable material responsive to changes in pressure interposed between said inner and outer members and effective to separate each said second passageway from its associated groups of first passageways in one state thereof and deflectable to another state to block the flow of said medium through adjacent first passageways, and means for selectively controlling the pressure in ones of said second passageways to cause said yieldable partition means to block the flow of the fluid medium through predetermined first passageways including a plurality of members disposed in abutting relationship, said members including a plurality of first passageways connected to the ports in said cylinder for conveying streams of the fluid medium therethrough, said members including a plurality of second passageways for conveying streams of the fluid medium transverse to said first plurality of passageways, yieldable partition means interposed between ones of said members for separating said first passageways from said second passageways, and means for selectively controlling the flow of the fluid medium through said second passageways to cause said yieldable partition means to block the flow of the fluid medium through predetermined first passageways.

6. A control system for effecting movement of associated apparatus to selected positions comprising, means forming a chamber, movable means within and dividing said chamber into separate compartments, means operatively interconnecting said movable means with the apparatus to be moved, means for effecting equal above-atmospheric fluid pressures across said movable means whereby it is held immobile, means to effect a pressure differential across said movable means whereby greater pressure on one side will cause it to move in the direction of least pressure to a selected position, said pressure differential means comprising a fluid operated master valve for selectively opening to atmosphere one of a plurality of ports in a wall of said chamber and ordinally aligned along the path of movement of said movable means whereby arrival thereof at the selected position will seal the port to permit the pressure across the movable means again to equalize and stop its movement and the movement of the associated apparatus at the selected position, said master valve having a plurality of fluid operated valve units interconnected by fluid passageways to form a valve tree whereby selective opening and closing of the valve units is effective to open or close passageways from the ordinally aligned ports in the cylinder wall to atmosphere, fluid means connected to said master valve for so operating said valve units, and binary output means for controlling said fluid means in a manner effecting the selection of one of said ordinally arranged ports.

7. A control system for effecting movement of associated apparatus comprising a cylinder, a piston within said cylinder, means operatively interconnecting said piston with the apparatus to be moved, means for effecting equal above-atmospheric fluid pressures across said piston whereby the piston is held immobile, means to effect a pressure differential across said piston whereby greater pressure on one side will cause the piston to move in the direction of least pressure to a selected position, said pressure differential means comprising a fluid operated master valve for selectively opening to atmosphere one of a plurality of ports in a wall of said cylinder and ordinally aligned along the path of movement of said piston whereby arrival of the piston at the selected position will seal the open port to permit the pressure across the piston again to equalize and stop movement of the piston and the associated apparatus, said master valve having a plurality of fluid operated valve units interconnected by fluid passageways to form a valve tree whereby selective opening and closing of the valve units is effective to open or close passageways from the ordinally aligned ports in the cylinder wall to atmosphere, fluid pressure means connected to said master valve for so operating said valve units, and binary output means for controlling said fluid pressure means in a manner effecting the selection of one of said ordinally arranged ports.

8. A control system for effecting movement of associated apparatus comprising, a cylinder, a piston within said cylinder, means operatively interconnecting said piston with the apparatus to be moved, means for effecting equal above-atmospheric fluid pressures across said piston whereby the piston is held immobile, means to effect a pressure differential across said piston whereby greater pressure on one side will cause the piston to move in the direction of least pressure to a selected position, said pressure differential means comprising a fluid operated master valve for selectively opening to atmosphere one of a plurality of ports in a wall of said cylinder and ordinally aligned along the path of movement of said piston whereby arrival of the piston at the selected position will seal the opened port to permit the pressure across the piston again to equalize and stop movement of the piston and the associated apparatus, said master valve having a plurality of fluid operated valve units interconnected by fluid passageways to form a valve tree whereby selective opening and closing of the valve units is effective to open or close passageways from the ordinally aligned ports in the cylinder wall to atmosphere, fluid pressure means including a plurality of fluid flow control valves connected to said master valve through fluid conduits for so operating said valve units, and binary output means for controlling the fluid flow from said fluid pressure means through said fluid control valves to said master valve in a manner effecting the selection of one of said ordinally arranged ports.

9. A control system for effecting movement of associated apparatus to selected positions comprising, a cylinder, a piston within said cylinder, means operatively connecting said piston to the apparatus to be moved, means for effecting equal fluid pressures across said piston whereby the piston is held immobile, means to effect a pressure differential across said piston whereby greater pressure on one side will cause the piston to move in the direction of least pressure to a selected position, said pressure differential means comprising a fluid operated master valve for selectively opening to a lower pressure zone one of a plurality of ports in a wall of said cylinder and ordinally aligned along the path of movement of said piston whereby arrival of the piston at the selected position will seal the opened port to permit the pressure across the piston again to equalize and stop movement of the piston and the associated apparatus, said master valve having a plurality of fluid operated valve units interconnected by fluid passageways to form a valve tree whereby selective opening and closing of the valve units is effective to open or close passageways from the ordinally aligned ports in the cylinder wall to said lower pressure, fluid pressure means including a source of fluid pressure and a plurality of electrically controlled fluid flow valves connected in flow passages between said source of fluid pressure and said master valve for so controlling said valve units, and binary electrical output means for controlling said fluid flow valves whereby the fluid flow from said fluid pressure source to said master valve is effective to select one of said ordinally arranged ports.

10. A control system for effecting movement of associated apparatus comprising, a cylinder, a piston within said cylinder, a rod connected to said piston and extending axially through said cylinder for connection outside of the cylinder to the apparatus to be moved, means for effecting equal above-atmospheric fluid pressures across said piston whereby the piston is held immobile, means to effect a pressure differential across said piston whereby greater pressure on one side will cause the piston to move in the direction of least pressure to a selected position, said pressure differential means comprising a fluid operated master valve for selectively opening to atmosphere one of a plurality of ports in a wall of said cylinder and ordinally aligned along the path of movement of said piston, whereby arrival of the piston at the selected position will seal the opened port to permit the pressure across the piston again to equalize and stop movement of the piston and the associated apparatus, said master valve having a plurality of fluid operated valve units interconnected by fluid passageways to form a valve tree whereby selective opening and closing of the valve units is effective to open or close passageways from the ordinally aligned ports in the cylinder wall to atmosphere, fluid pressure means including a source of fluid pressure and plurality of electrically controlled fluid flow valves connected to said master valve for so operating said valve units, and binary electrical output means for controlling said fluid flow valves whereby the fluid flow from said fluid pressure source to said master valve is effective to select one of said ordinally arranged ports.

11. A control system in accordance with claim 9 wherein said master valve includes a plurality of said valve trees, and electrically controlled valve means interconnecting said trees, each of said plurality of electrically controlled fluid flow valves and said last mentioned electrically controlled valve means being controlled by a different value binary electrical signal from said binary electrical output means whereby said ordinally arranged ports are selected by permutations of valve selections in accordance with their corresponding binary weight or value.

References Cited in the file of this patent
UNITED STATES PATENTS

| | | |
|---|---|---|
| 2,398,997 | Berry | Apr. 23, 1946 |
| 2,976,843 | Weibel | Mar. 28, 1961 |
| 2,993,508 | Wagner | July 25, 1961 |
| 2,999,001 | Gross | Sept. 5, 1961 |
| 2,999,482 | Bower | Sept. 12, 1961 |
| 3,009,478 | Lehman | Nov. 21, 1961 |
| 3,083,943 | Stewart | Apr. 2, 1963 |

OTHER REFERENCES

Gilovich: IBM Technical Disclosure Bulletin, volume 1, No. 4, December 1958.